United States Patent [19]

Tsuboi et al.

[11] Patent Number: 4,900,702
[45] Date of Patent: Feb. 13, 1990

[54] DIELECTRIC CERAMIC COMPOSITION

[75] Inventors: Takashi Tsuboi; Hitoshi Ueda, both of Tottori, Japan

[73] Assignee: Nippon Ferrite, Ltd., Tokyo, Japan

[21] Appl. No.: 258,426

[22] Filed: Oct. 17, 1988

[30] Foreign Application Priority Data

Oct. 27, 1987 [JP] Japan .................. 62-271232
Apr. 11, 1988 [JP] Japan .................. 63-89647
Apr. 11, 1988 [JP] Japan .................. 63-89648

[51] Int. Cl.$^4$ ............................. C04B 35/46
[52] U.S. Cl. .................... 501/134; 501/135; 501/136
[58] Field of Search ............ 501/134, 135, 136

[56] References Cited

U.S. PATENT DOCUMENTS 4,119,554 10/1978 Fujiwara .................. 501/135

FOREIGN PATENT DOCUMENTS

| 1302993 | 1/1971 | Fed. Rep. of Germany | 501/134 |
| 49-038196 | 4/1974 | Japan | 501/134 |
| 50-050697 | 5/1975 | Japan | 501/135 |
| 54-20680 | 7/1979 | Japan | 501/135 |
| 54-21557 | 7/1979 | Japan | 501/135 |
| 54-21959 | 8/1979 | Japan | 501/135 |
| 60-7322 | 2/1985 | Japan | 501/135 |
| 60-29212 | 7/1985 | Japan | 501/135 |
| 61-17321 | 5/1986 | Japan | 501/135 |
| 61-59525 | 12/1986 | Japan | 501/135 |
| 62-17368 | 4/1987 | Japan | 501/135 |
| 0622795 | 9/1978 | U.S.S.R. | 501/135 |
| 0987394 | 3/1965 | United Kingdom | 501/135 |
| 1455788 | 11/1976 | United Kingdom | 501/135 |
| 2096128 | 10/1982 | United Kingdom | 501/135 |

Primary Examiner—Mark L. Bell
Assistant Examiner—Anthony J. Green
Attorney, Agent, or Firm—Finnegan, Henderson, Farabow, Garrett & Dunner

[57] ABSTRACT

A dielectric ceramic composition having a high relative dielectric constant a high quality factor and a small temperature coefficient of resonance frequency, consisting essentially of calcium oxide, strontium, oxide, bismuth oxide and titanium oxide, and having a composition represented by the formula:

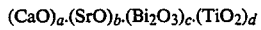

$(CaO)_a \cdot (SrO)_b \cdot (Bi_2O_3)_c \cdot (TiO_2)_d$ wherein $0 \leq a < 30$, $0 < b \leq 20$, $10 \leq c \leq 50$, $40 \leq d \leq 80$, and $0 < a+b \leq 30$ by mol %.

This composition may contain at least one of thallium oxide, yttrium oxide and manganese oxide and at least one of germanium oxide, zirconium oxide, tin oxide, cerium oxide and hafnium oxide.

4 Claims, No Drawings

DIELECTRIC CERAMIC COMPOSITION

BACKGROUND OF THE INVENTION

The present invention relates to a dielectric ceramic composition having a high relative dielectric constant ($\epsilon r$) and a small and widely controllable temperature coefficient of resonance frequency ($\tau f$).

Recently, ceramic filters have been widely used for movable radio transmitters and receivers such as automobile telephones and cordless telephones operable at microfrequency bands from MHz to GHz. This is due to the fact that the dielectric materials constituting the ceramic filters have high dielectric constants ($\epsilon r$) and quality factors Q under no load ($Q_0$), and that their temperature coefficients ($\tau f$) of resonance frequency are freely controllable on both the positive and the negative sides from 0 by changing the compositions of the dielectric materials.

Conventional dielectric materials are, for instance, MgO—CaO—TiO$_2$, ZrO$_2$—TiO$_2$—SnO$_2$, and BaO—TiO$_2$-lanthanoid oxide, etc.

However, these dielectric materials have relative dielectric constants ($\epsilon r$) less than 100, and the miniaturization of resonance elements formed from them is inherently limited.

Therefore, there is a strong desire for dielectric ceramic compositions with high relative dielectric constants ($\epsilon r$).

SUMMARY OF THE INVENTION

As a result of intense research directed toward developing a dielectric ceramic composition having a relative dielectric constant ($\epsilon r$) of 100 or more, a temperature coefficient ($\tau f$) of $\pm 100$ ppm/°C. or less and a quality factor under no load ($Q_0$) of 100 or more, the inventors have found that the above properties can be obtained when the dielectric ceramic composition has a composition represented by the formula:

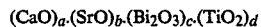

wherein $0 \leq a < 30$, $0 < b \leq 20$, $10 \leq c \leq 50$, $40 \leq d \leq 80$, and $0 < a+b \leq 30$ by mol %.

DETAILED DESCRIPTION OF THE INVENTION

According to a first embodiment of the present invention, the dielectric ceramic composition is represented by the general formula:

$$(CaO)_a \cdot (SrO)_b \cdot (Bi_2O_3)_c \cdot (TiO_2)_d$$

wherein $0 \leq a < 30$, $0 < b \leq 20$, $10 \leq c \leq 50$, $40 \leq d \leq 80$, and $0 < a+b \leq 30$ by mol %.

When the contents of CaO, SrO, Bi$_2$O$_3$ and TiO$_2$ are not in the above composition ranges, the $Q_0$ becomes less than 100, so that the dielectric ceramic composition is unsuitable for practical applications.

The preferred contents of CaO, SrO, Bi$_2$O$_3$ and TiO$_2$ are $0 \leq a \leq 10$, $5 \leq b \leq 15$, $25 \leq c \leq 30$, $50 \leq d \leq 60$ and $5 \leq a+b \leq 20$ by mol %.

The dielectric ceramic composition according to a second embodiment of the present invention has a main composition represented by the general formula:

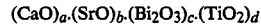

wherein $0 \leq a < 30$, $0 < b \leq 20$, $10 \leq c \leq 50$, $40 \leq d \leq 80$, and $0 < a+b \leq 30$ by mol %, and further contains at least one of the following components:

5 weight % or less of thallium oxide (Tl$_2$O$_3$),
5 weight % or less of yttrium oxide (Y$_2$O$_3$), and
0.6 weight % or less of manganese oxide (MnO).

When Tl$_2$O$_3$ exceeds 5 weight %, the $Q_0$ becomes less than 100, and the $\tau f$ becomes largely negative. And when Y$_2$O$_3$ exceeds 5 weight %, or when MnO exceeds 0.6 weight %, similar problems take place, providing ceramic materials unsuitable for practical applications.

The preferred contents of CaO, SrO, Bi$_2$O$_3$ and TiO$_2$ are $0 \leq a \leq 10$, $5 \leq b \leq 15$, $25 \leq c \leq 30$, $50 \leq d \leq 60$ and $5 \leq a+b \leq 20$ by mol %, and the total amount of Tl$_2$O$_3$, Y$_2$O$_3$ and MnO is preferably 2 weight % or less.

The dielectric ceramic composition according to a third embodiment of the present invention has a composition represented by the general formula:

wherein R represents at least one of Ge, Zr, Sn, Ce and Hf, and a, b, c, d and e satisfy $0 \leq a < 30$, $0 < b \leq 20$, $10 \leq c \leq 50$, $40 \leq d \leq 80$, $0 < e < 5$, and $0 < a+b \leq 30$ by mol %.

When GeO$_2$, ZrO$_2$, SnO$_2$, CeO$_2$ and HfO$_2$ reach 5 mol %, the $Q_0$ becomes less than 100, and the $\tau f$ cannot be detected at high temperatures because measured peaks are concealed by noises or become increasingly negative, making the dielectric ceramic composition unsuitable for practical applications.

The preferred contents of CaO, SrO, Bi$_2$O$_3$ and TiO$_2$ are $0 \leq a \leq 10$, $5 \leq b \leq 15$, $25 \leq c \leq 30$, $50 \leq d \leq 60$ and $5 \leq a+b \leq 20$ by mol %, and RO$_2$ is preferably 2 mol % or less.

The dielectric ceramic composition of the present invention can be prepared by mixing and sintering starting material powders in the predetermined proportions. The starting materials may be carbonates, nitrates, organic acid salts, etc. because they are thermally decomposed to form the corresponding oxides.

EXAMPLE 1

CaCO$_3$ powder, SrCO$_3$ powder, Bi$_2$O$_3$ powder and TiO$_2$ powder were introduced into a polyethylene pot in the proportions as shown in Table 1 together with agate balls and acetone, and mixed for 16 hours.

The resulting slurry was dried by heating and classified with a 5-mesh sieve, and then burned at 1000° C. for 2 hours in the air. The burned product was again introduced into the polyethylene pot containing agate balls together with acetone and pulverized for 16 hours.

The resulting slurry was dried by heating, mixed with a polyvinyl alcohol aqueous solution, and then granulated with a 32-mesh sieve.

The granulated powder was pressed at 1 ton/cm$^2$, and sintered in the atmosphere at 1200°–1400° C. for 4 hours. The resulting sintered product was worked to have a diameter of about 30 mm and a height of about 15 mm. This sample was measured at about 1 GHz to obtain a peak in a TE$_{011}$ mode, and the sample's $\epsilon r$ and $Q_0$ were calculated from the above peak. Next, the $\tau f$ was determined from the variation or resonance frequency between $-20°$ C. and $+60°$ C. The results are shown in Table 1.

TABLE 1

| Sample No. | Composition (mol %) | | | | $\epsilon r$ | $Q_0$ | $\tau f$ (ppm/°C.) |
| --- | --- | --- | --- | --- | --- | --- | --- |
| | CaO | SrO | $Bi_2O_3$ | $TiO_2$ | | | |
| 1 | 0 | 14.29 | 28.57 | 57.14 | 198 | 168 | −30 |
| 2 | 1 | 13.29 | 28.57 | 57.14 | 196 | 182 | −10 |
| 3 | 2 | 12.29 | 28.57 | 57.14 | 192 | 188 | +1 |
| 4 | 2.86 | 11.43 | 28.57 | 57.14 | 188 | 196 | +18 |
| 5 | 4 | 10.29 | 28.57 | 57.14 | 184 | 200 | +40 |
| 6 | 5 | 9.29 | 28.57 | 57.14 | 180 | 210 | +62 |
| 7 | 5.71 | 8.57 | 28.57 | 57.14 | 176 | 230 | +75 |
| 8 | 6 | 8.29 | 28.57 | 57.14 | 177 | 220 | +80 |
| 9 | 6.5 | 7.79 | 28.57 | 57.14 | 176 | 220 | +84 |
| 10 | 20 | 10 | 40 | 30 | 169 | 53 | +30 |
| 11 | 5 | 25 | 20 | 50 | 150 | 90 | +42 |
| 12 | 10 | 10 | 5 | 75 | 120 | 95 | +320 |

Note:
Sample Nos. 1–9: Examples of the present invention
Sample Nos. 10–12: Comparative Examples

EXAMPLE 2

$CaCO_3$ powder, $SrCO_3$ powder, $Bi_2O_3$ powder, $TiO_2$ powder, $Tl_2O_3$ powder, $Y_2O_3$ powder and $MnCO_3$ powder were introduced into a polyethylene pot in the proportions as shown in Table 2 together with agate balls and acetone, and mixed for 16 hours.

The resulting slurry was dried by heating and classified with a 5-mesh sieve, and then burned at 1000° C. for 2 hours in the air. The burned product was again introduced into the polyethylene pot containing agate balls together with acetone and pulverized for 16 hours.

The resulting slurry was dried by heating, mixed with a polyvinyl alcohol aqueous solution, and then granulated with a 32-mesh sieve.

The granulated powder was pressed at 1 ton/cm², and sintered in the atmosphere at 1200°–1400° C. for 4 hours. The resulting sintered product was worked to have a diameter of about 30 mm and a height of about 15 mm. This sample was measured at about 1 GHz to obtain a peak in a $TE_{011}$ mode, and the sample's $\epsilon r$ and $Q_0$ were calculated from the above peak. Next, the $\tau f$ was determined from the variation of resonance frequency between −20° C. and +60° C. The results are shown in Table 2.

TABLE 2

| Sample No. | Composition (mol %) | | | | Additives (weight %) | | $\epsilon r$ | $Q_0$ | $\tau f$ (ppm/°C.) |
| --- | --- | --- | --- | --- | --- | --- | --- | --- | --- |
| | CaO | SrO | $Bi_2O_3$ | $TiO_2$ | | | | | |
| 1 | 2.86 | 11.43 | 28.57 | 57.14 | $Tl_2O_3$ | 0.1 | 187 | 174 | −6 |
| 2 | 2.86 | 11.43 | 28.57 | 57.14 | $Tl_2O_3$ | 1.0 | 188 | 179 | −9 |
| 3 | 4.0 | 10.29 | 28.57 | 57.14 | $Tl_2O_3$ | 3.0 | 184 | 200 | +5 |
| 4 | 2.86 | 11.43 | 28.57 | 57.14 | $Y_2O_3$ | 0.5 | 179 | 163 | +7 |
| 5 | 2.86 | 11.43 | 28.57 | 57.14 | MnO | 0.006 | 188 | 203 | +1 |
| 6 | 4.0 | 10.29 | 28.57 | 57.14 | MnO | 0.003 | 184 | 220 | +5 |
| 7 | 2.86 | 11.43 | 28.57 | 57.14 | $Y_2O_3$ | 3.0 | 169 | 138 | +2 |
| 8 | 4.0 | 10.29 | 28.57 | 57.14 | $Tl_2O_3$ MnO | 1.0 0.006 | 185 | 170 | +3 |
| 9 | 2.86 | 11.43 | 28.57 | 57.14 | $Y_2O_3$ MnO | 0.5 0.006 | 180 | 199 | +2 |
| 10 | 2.86 | 11.43 | 28.57 | 57.14 | $Tl_2O_3$ $Y_2O_3$ | 1.0 0.1 | 182 | 179 | −1 |
| 11 | 2.86 | 11.43 | 28.57 | 57.14 | $Tl_2O_3$ $Y_2O_3$ | 0.05 0.1 | 185 | 186 | −2 |
| 12 | 2.86 | 11.43 | 28.57 | 57.14 | $Tl_2O_3$ | 6.0 | 179 | 90 | −22 |
| 13 | 2.86 | 11.43 | 28.57 | 57.14 | $Y_2O_3$ | 6.0 | 142 | 89 | −48 |
| 14 | 2.86 | 11.43 | 28.57 | 57.14 | MnO | 0.9 | 186 | 85 | −52 |

Note:
Sample Nos. 1–11: Examples of the present invention
Sample Nos. 12–14: Comparative Examples

EXAMPLE 3

$CaCO_3$ powder, $SrCO_3$ powder, $Bi_2O_3$ powder, $TiO_2$ powder, $GeO_2$ powder, $ZrO_2$ powder, $SnO_2$ powder, $CeO_2$ powder and $HfO_2$ powder were introduced into a polyethylene pot in the proportions as shown in Table 3 together with agate balls and acetone, and mixed for 16 hours.

The resulting slurry was dried by heating and classified with a 5-mesh sieve, and then burned at 1000° C. for 2 hours in the air. The burned product was again introduced into the polyethylene pot containing agate balls together with acetone and pulverized for 16 hours.

The resulting slurry was dried by heating, mixed with a polyvinyl alcohol aqueous solution, and then granulated with a 32-mesh sieve.

The granulated powder was pressed at 1 ton/cm², and sintered in the atmosphere at 1200°–1400° C. for 4 hours. The resulting sintered product was worked to have a diameter of about 30 mm and a height of about 15 mm. This sample was measured at about 1 GHz to obtain a peak in a $TE_{011}$ mode, and the sample's $\epsilon r$ and $Q_0$ were calculated from the above peak. Next, the $\tau f$ was determined from the variation of resonance frequency between −20° C. and +60° C. The results are shown in Table 3.

TABLE 3

| Sample No. | Composition (mol %) | | | | $RO_2$ | | $\epsilon r$ | $Q_0$ | $\tau f$ (ppm/°C.) |
| --- | --- | --- | --- | --- | --- | --- | --- | --- | --- |
| | CaO | SrO | $Bi_2O_3$ | $TiO_2$ | | | | | |
| 1 | 2.86 | 11.43 | 28.57 | 57.04 | $GeO_2$ | 0.1 | 186 | 179 | −5 |
| 2 | 2.86 | 11.43 | 28.57 | 56.14 | $GeO_2$ | 1.0 | 181 | 166 | −15 |
| 3 | 2.86 | 11.43 | 28.57 | 56.64 | $ZrO_2$ | 0.5 | 185 | 170 | +2 |
| 4 | 2.86 | 11.43 | 28.57 | 56.14 | $ZrO_2$ | 1.0 | 181 | 140 | −12 |
| 5 | 2.86 | 11.43 | 28.57 | 57.06 | $SnO_2$ | 0.08 | 188 | 175 | +8 |
| 6 | 2.86 | 11.43 | 28.57 | 56.14 | $SnO_2$ | 1.0 | 175 | 133 | −60 |
| 7 | 2.86 | 11.43 | 28.57 | 56.54 | $CeO_2$ | 0.6 | 186 | 192 | −1 |
| 8 | 2.86 | 11.43 | 28.57 | 56.14 | $CeO_2$ | 1.0 | 182 | 191 | −16 |
| 9 | 2.86 | 11.43 | 28.57 | 56.64 | $HfO_2$ | 0.5 | 182 | 165 | +2 |
| 10 | 2.86 | 11.43 | 28.57 | 56.14 | $HfO_2$ | 1.0 | 178 | 138 | −54 |

TABLE 3-continued

| Sample No. | Composition (mol %) | | | | | | $\epsilon_r$ | $Q_0$ | $\tau f$ (ppm/°C.) |
| --- | --- | --- | --- | --- | --- | --- | --- | --- | --- |
| | CaO | SrO | $Bi_2O_3$ | $TiO_2$ | $RO_2$ | | | | |
| 11 | 5.0 | 9.29 | 28.57 | 56.14 | $GeO_2$ | 1.0 | 179 | 205 | +4 |
| 12 | 2.86 | 11.43 | 28.57 | 52.14 | $GeO_2$ | 5 | 159 | 90 | −89 |
| 13 | 2.86 | 11.43 | 28.57 | 52.14 | $ZrO_2$ | 5 | 171 | 50 | —* |
| 14 | 2.86 | 11.43 | 28.57 | 52.14 | $SnO_2$ | 5 | 170 | 75 | —* |
| 15 | 2.86 | 11.43 | 28.57 | 52.14 | $CeO_2$ | 5 | 148 | 58 | −190 |
| 16 | 2.86 | 11.43 | 28.57 | 52.14 | $HfO_2$ | 5 | 172 | 26 | —* |

Note:
Sample Nos. 1–11: Examples of the present invention
Sample Nos. 12–16: Comparative Examples
*Unmeasurable As described above in detail, the dielectric ceramic composition of the present invention shows high $\epsilon_r$ and $Q_0$, and its $\tau f$ can be widely controlled by adjusting the ratio of CaO/SrO, the amounts of $Tl_2O_3$, $Y_2O_3$ and MnO, and the amounts of $GeO_2$, $ZrO_2$, $SnO_2$, $CeO_2$ and $HfO_2$. It is highly suitable for microwave dielectric elements and temperature compensating capacitors, etc.

What is claimed is:

1. A dielectric ceramic composition consisting essentially of calcium oxide, strontium oxide, bismuth oxide and titanium oxide, and having a composition represented by the formula:

$$(CaO)_a \cdot (SrO)_b \cdot (Bi_2O_3)_c \cdot (TiO_2)_d$$

wherein $0 \leq a \leq 10$, $5 \leq b \leq 15$, $25 \leq c \leq 30$, $50 \leq d \leq 60$, and $5 \leq a+b \leq 20$ by mol %.

2. The dielectric ceramic composition according to claim 1, further consisting essentially of at least one of 5 weight % or less of thallium oxide, 5 weight % or less of yttrium oxide and 0.6 weight % or less of manganese oxide.

3. A dielectric ceramic composition consisting essentially of calcium oxide, strontium oxide, bismuth oxide, titanium oxide and at least one of germanium oxide, zirconium oxide, tin oxide, cerium oxide and hafnium oxide, and having a composition represented by the formula:

$$(CaO)_a \cdot (SrO)_b \cdot (Bi_2O_3)_c \cdot (TiO_2)_d \cdot (RO_2)_e$$

wherein R represents at least one of Ge, Zr, Sn, Ce and Hf, and a, b, c, d and e satisfy $0 \leq a \leq 10$, $5 \leq b \leq 15$, $25 \leq c \leq 30$, $50 \leq c \leq 60$, $0 \leq e \leq 2$ and $5 \leq a+b \leq 20$ by mol %.

4. A sintered ceramic article consisting essentially of greater than 0 to less than 10 mol % CaO, greater than 5 to less than 15 mol % SrO, greater than 25 to less than 30 mol % $Bi_2O_3$, greater than 50 to less than 60 mol % $TiO_2$, the total content of CaO and SrO being greater than 5 but less than 20 mol %, said article having a quality factor under no load, $Q_0$, of at least 100 and a temperature coefficient of resonance frequency, $\tau f$, measured between −20° C. and +60° C. of ±100 ppm/°C.

* * * * *

UNITED STATES PATENT AND TRADEMARK OFFICE
CERTIFICATE OF CORRECTION

PATENT NO. : 4,900,702

DATED : February 13, 1990

INVENTOR(S) : Takashi Tsuboi and Hitoshi Ueda

It is certified that error appears in the above-identified patent and that said Letters Patent is hereby corrected as shown below:

Claim 3, column 6, line 25, change "$0 \leq e \leq 2$" to --$0 < e \leq 2$--.

Signed and Sealed this

Ninth Day of July, 1991

Attest:

HARRY F. MANBECK, JR.

Attesting Officer

Commissioner of Patents and Trademarks